(No Model.)   4 Sheets—Sheet 1.

S. STEWART.
COFFEE ROASTER.

No. 327,344.  Patented Sept. 29, 1885.

Attest:
W. J. Hall
Byron Conklin

Inventor.
Samuel Stewart (No Model.) 4 Sheets—Sheet 2.
S. STEWART.
COFFEE ROASTER.
No. 327,344. Patented Sept. 29, 1885.
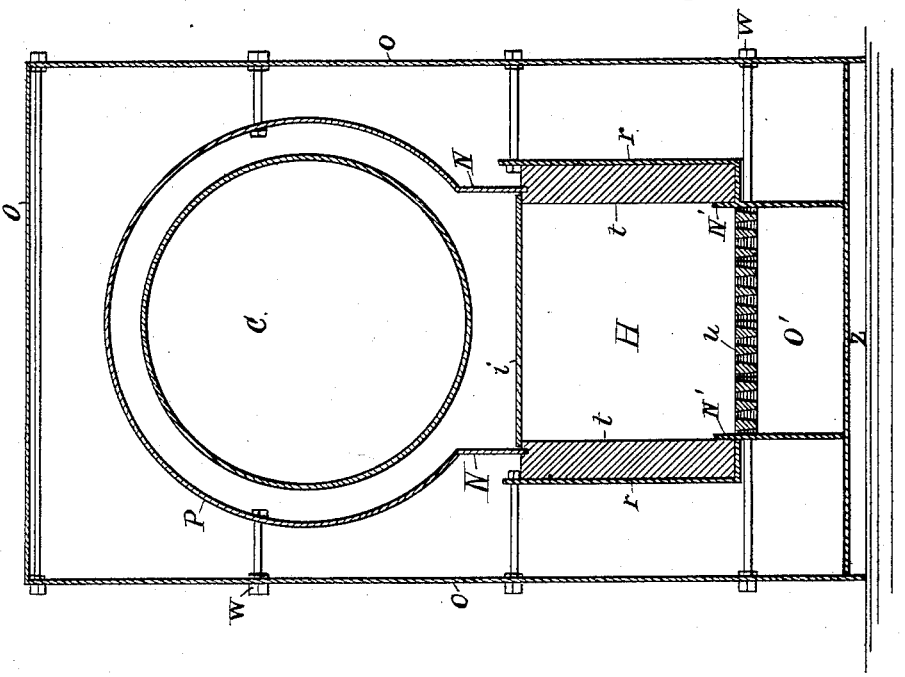
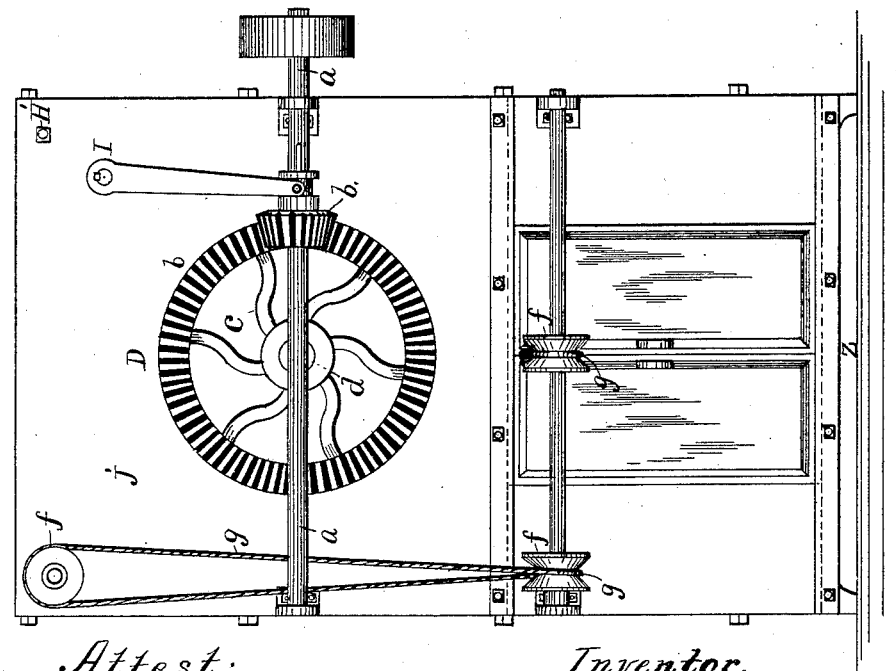
Attest:
W. J. Hall
Byron Conklin
Inventor.
Samuel Stewart (No Model.)  4 Sheets—Sheet 3
S. STEWART.
COFFEE ROASTER.
No. 327,344. Patented Sept. 29, 1885.
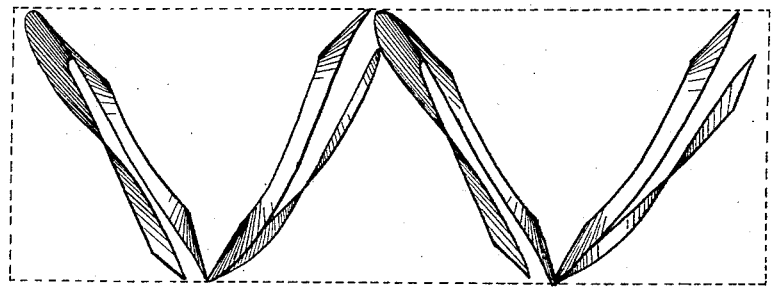
Fig. 4. Side view of agitators
Fig. 5. Face view of same.
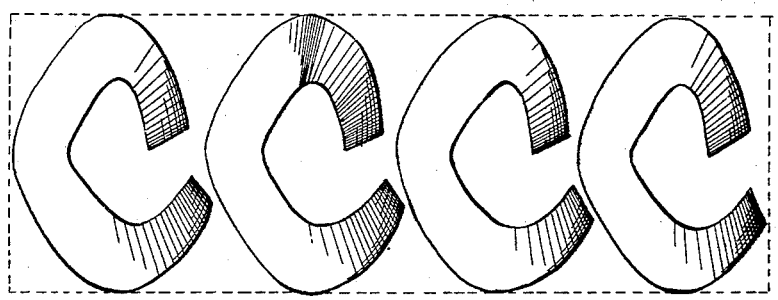
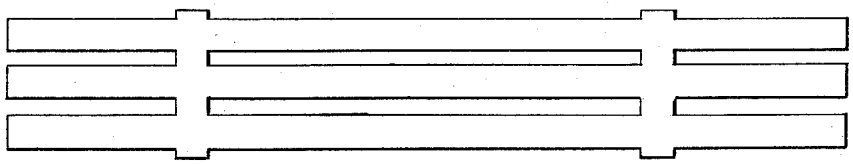 
Fig. 6. Face of Grate Bars. Fig. 7. End.
Fig. 4. Section.
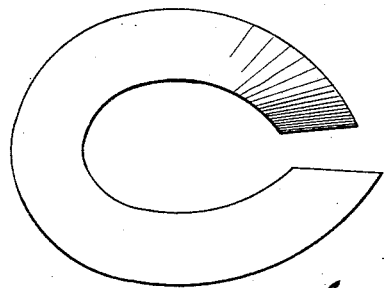
Witneses.
Bynn Conklin
W. J. Hall
Inventor.
Samuel Stewart (No Model.) 4 Sheets—Sheet 4.

S. STEWART.
COFFEE ROASTER.

No. 327,344. Patented Sept. 29, 1885.

Witness. Inventor.

UNITED STATES PATENT OFFICE.

SAMUEL STEWART, OF NEWARK, NEW JERSEY.

COFFEE-ROASTER.

SPECIFICATION forming part of Letters Patent No. 327,344, dated September 29, 1885.

Application filed February 2, 1885. (No model.)

*To all whom it may concern:*

Be it known that I, SAMUEL STEWART, a citizen of the United States, residing in the city of Newark, county of Essex, and State of New Jersey, have invented certain new and useful Improvements in Coffee-Roasters and Portable Iron Ovens; and I do hereby declare that the following is a full, clear, and exact description of the said invention, such as will enable others skilled in the art to which the same appertains to construct and operate the said machine, reference being had to the accompanying drawings, and to the letters of reference marked thereon, which form a part of this specification.

The first object of this invention is to save power by doing away with all pulleys, belts, counter-shafts, and consequent friction and wear; secondly, to economize floor-space; thirdly, an appreciable gain in time required to discharge the coffee when roasted; fourthly, to protect the coffee from being discolored or burned in case of any accident to or stoppage of the machinery; fifthly, to save the cost and outlay involved in building and rebuilding the fire-pits of the ordinary brick ovens in common use.

The invention consists in the improved coffee-roaster and portable iron oven, constructed and operated substantially as will be hereinafter set forth in the specification, and embodied in the claims.

Figure 1:
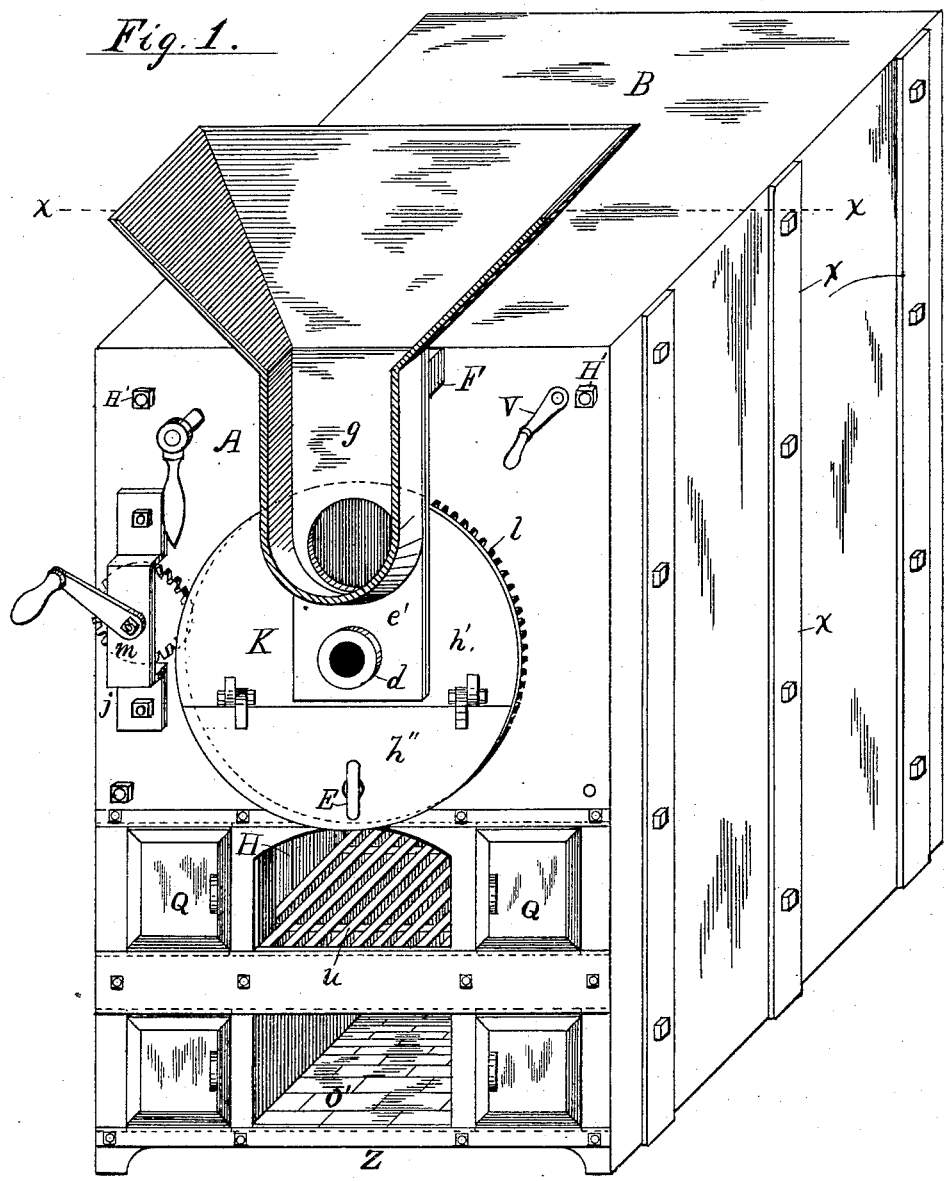
Figure 8:
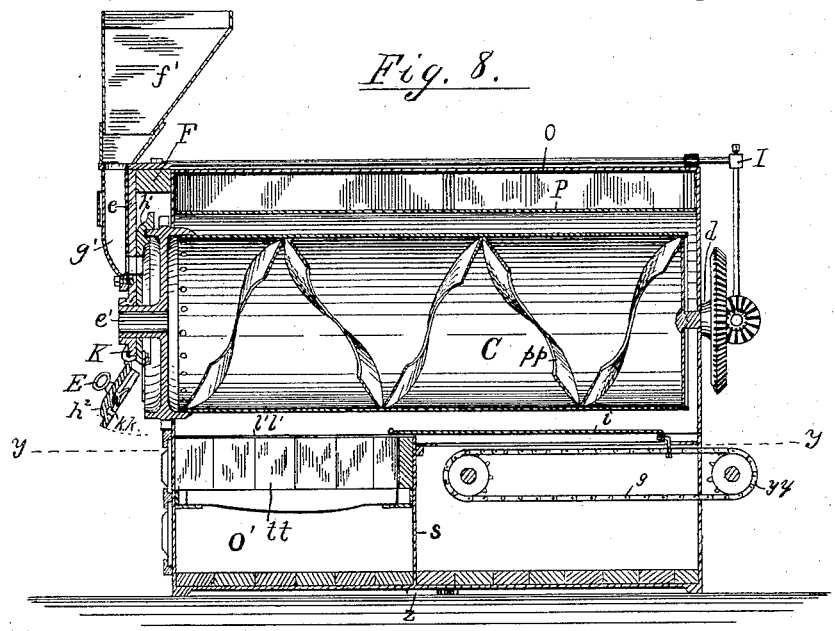
Figure 9:
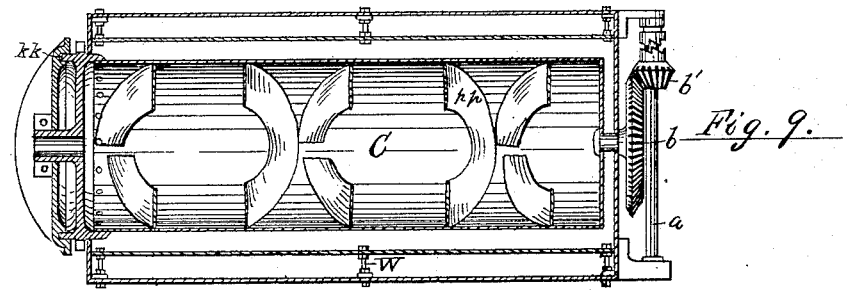
Figure 10:
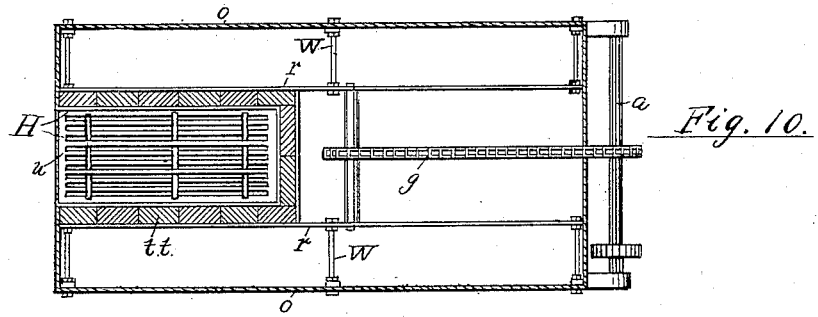

Referring to the drawings, Figure 1 is a perspective view of the exterior of my improved coffee-roaster, showing the front end, A, and oblique top B, and one side thereof. Fig. 2 is a vertical back view, D. Fig. 3 is a sectional vertical drawing of the oven, cut through the center thereof at X X, Fig. 1, showing the outer shell, W, circular crown or arch plate P, provided with vertical side flanges, N N, fire box or chamber H, with upward projecting flanges N' N', to secure the fire-brick *t t* in position; also, the grate-bars *u*, ash-pit O', and the protection-plate *i*. Fig. 4 represents the agitators, which are placed within the cylinder *c*, Figs. 3 and 8. Fig. 5 represents the agitators in a reverse view, as shown in Fig. 4. Fig. 6 shows a plan view of the grate-bars *u*, Fig. 3, cast in sections. Fig. 7 shows an end view of one section of said grate-bars. Fig. 8 is a longitudinal central sectional view of Fig. 1, showing the interior of the cylinder *c*, the arrangement of the agitators *p p*, protection-plate *i*, and the toothed wheels *y y*, and chain *g*, moving said protection-plate backward and forward. Fig. 9 is a horizontal central sectional view of the cylinder *c* and agitators *p p*, showing, also, the clutch-gearing *b* and *b'* at the rear thereof. Fig. 10 is a horizontal central sectional view of the fire-box H, Fig. 1, and the grate-bars *u*, cast in sections, the chain *g* moving the protection-plate *i* backward and forward and cut through Fig. 8, Y Y.

In more particularly referring to the drawings, *j j*, Figs. 1 and 2, are the front and back plates, made of cast-iron, securely fastened to the shell of the oven by means of bolts H' H', Figs. 1 and 2, running the entire length of the oven and underneath the top B thereof. The crank N'' turns a shaft which carries a pulley, *f*. From this pulley an endless cord, belt, or chain, *g*, extends to another pulley, *f*, on another shaft at right angles to the former. This second shaft carries, also, a third pulley, *f*, from which a cord extends to the contiguous end of protection-plate *i*. By means of the crank N'', Fig. 1, the pulleys *f f f*, Fig. 2, chains *g g*, Figs. 2 and 10, or other suitable mechanical device, the protection-plate *i*, Figs. 2, 3, and 8, is moved forward and between the cylinder *c*, Figs. 2, 3, and 8, and the fire, to prevent the coffee from discoloration and burning in case of accident to or stoppage of the machinery, thus preventing the wasting of a single pound of coffee. When the protection-plate *i* is not in use, it rests upon the back or bridge wall, *s*, Fig. 8, away from the action of the fire; but when moved forward it has its bearing on flanges *l' l'*, just above the fire-brick on either side, as shown in Fig. 8.

K, Fig. 1, is the outer head of the cylinder, which is cast in two sections, the upper section, *h'*, Fig. 1, being stationary, the lower one, *h''*, Figs. 1 and 8, being hinged to the other or upper in manner to swing upward, as shown in Fig. 8, to allow the discharge of the coffee when roasted.

To close the cylinder, I employ a hand-lock, E, Figs. 1 and 8, by means of which the lower or hinged section is securely fastened down.

To prevent the grinding of the coffee, and at the same time to provide a close head for the cylinder, I have cut a groove (allowing for the expansion by heat) in the outer head, in which a flange of the inner or skeleton head runs, as shown at *k k*, Figs. 8 and 9.

To operate the cylinder by hand, when necessary, as in case of accident to or stoppage of the machinery, I introduce a hand ratchet or gear, *m*, Fig. 1, fastened to the front plate in such manner as to be used or not. This, with the toothed or cogged and outer flange, *l*, Fig. 1, of the skeleton-head, forms a gear for said purpose. No strain is brought thereby on the outer head.

I have adopted the sliding movement of the cast-iron doors Q Q, Fig. 1, both in front of the fire-box H and the ash-pit O', for the double purpose of being less in the way of the operator, and that they, in connection with the protection-plate *i*, Figs. 2, 3, and 8, hereinbefore described, may be readily adjusted to regulate the heat or draft.

The fire-box H, Fig. 1, is provided with fire-brick *t t*, Figs. 3, 8, and 10, held in position by the means hereinafter described; also with grate-bars *u*, Figs. 1, 3, and 10, cast in sections, as shown in Figs. 6 and 10, whence they are interchangeable and reversible, and in the event of breakage an entire new grate need not be procured, and being interchangeable will outlast the ordinary grate-bars cast in single sections. The fire-box extends only from one-third to one-half the length of the cylinder or oven. Underneath the fire-pit is the ash-pit O', in the bottom of which are laid ordinary hard-burned brick or other suitable material, as shown in Fig. 8, to prevent heating the floor, and underneath this and between the floor is an air-space, Z, Figs. 1 and 2, running the entire length of the oven, for the free circulation of air, to prevent the dry-rot and heating the floor.

To avoid friction and gain power, I employ a main power-shaft, *a*, Figs. 2 and 9, upon which is a clutch-gearing, *b*, Figs. 2 and 9, connecting with another cog-wheel, *b'*, Figs. 2 and 9, which drives the cylinder *c*, Figs. 2, 3, 8, and 9, which is securely held in proper position by the bearing-box *d*, Figs. 2, 8, and 9, and the hanger *e*, Figs. 1 and 8, which in turn is firmly fastened to the horizontal post F, Figs. 1 and 8. By this means I do away with all pulleys, however many roasters may be grouped together, by placing a single pulley upon the main power-shaft, as nearly as may be in the center of the group, thus gaining in power and doing away with friction and its consequent wear. By the use of the single pulley upon the main power-shaft and the aforesaid clutch-gearing thereupon, in connection with the lever I, Figs. 1 and 2, the cylinder can be readily thrown in and out of gear. By this contrivance—the hereinbefore-described protection-plate *i* and the hand-ratchet *m*—the contents of the cylinder are always at the absolute control of the operator, and a consequent saving is acquired from the non-burning and non-discoloration thereof.

The cylinder C, Figs. 8 and 9, is provided with agitators *p p* within, as shown in Figs. 8 and 9, thus keeping the contents thereof in a uniform motion to and fro and equally distributed throughout the entire length of the cylinder; also, for the purpose of discharging rapidly the coffee when done. The aforesaid agitators *p p*, like the cylinder, are constructed of heavy sheet-iron. In form they are a series of irregular oval flanges open at one end, as shown in Fig. 9, to allow the coffee to freely pass from one oval to another. Said flanges are placed at opposite and alternate angles to each other sufficient to force the contents of the cylinder backward and forward. The contents of the cylinder are kept within the cylinder by the hereinbefore-described or hinged section *h"*.

In referring to Fig. 3, which shows the construction of the oven, consisting of two heavy sheet-iron shells, the outer shell consists of three sections—to wit, the two sides and top O O O. The inner section is also built in three sections, one of which is the circular arch-plate P, reaching to the top of the fire box or chamber H on both sides. The sides of fire-box A and the ash-pit O', the two other sections, are also constructed of heavy sheet-iron, as shown at *r r*, bent at right angles at the base of the sides of the fire-box, forming a shelf-like piece, upon which the fire-brick *t t* rest, lining the fire-box, and are firmly held in position by the downward-projecting flanges N N of the arch-plate P, running in grooves cut in the top of the fire-brick, thus protecting said flanges from the action of the heat, and also by the upward projecting flanges N' N' of the sides of the ash-pit O', extending even with the top of the grate-bars *u*, thus enabling the fire-brick to be replaced without removing the cylinder. The outer and inner shells are securely fastened to each other by means of bolts W W, leaving a space between the two shells for the free circulation of air, thereby preventing radiation of heat.

To strenghten the roaster I employ wrought-iron posts running up the sides of the roaster and on the inner side of the outer shell, at equal distances, as shown in Fig. 1 at X X, through which the bolts W W run, fastening the two shells together. At the base said posts are bent at right angles, forming feet, provided with holes through which bolts run, firmly fastening the entire roaster to the floor. For testing the coffee during the process of roasting, I have provided a try-hole, *e'*, Fig. 1. The green coffee is held in the hopper *f'*, Figs. 1 and 8, from which it is conducted to the cylinder by means of the spout *g*, Figs. 1 and 8.

Having thus described the various parts of my invention, what I claim as new and useful in a coffee-roasting apparatus, and wish to secure by Letters Patent, is—

1. The combination of the outer grooved head of the coffee-roasting cylinder with the toothed skeleton inner head thereof, which fits into the groove of said outer head, and a gear-wheel which engages with the teeth of said inner head to rotate the same without applying any strain to the the outer head, substantially as set forth.

2. The protection-plate $i$ or shield, in combination with the furnace H, revolving cylinder C, the crank N'', pulleys $fff$, and chains $gg$, substantially as and for the purpose set forth.

In testimony that I claim the foregoing as my invention I have signed my name, in presence of two witnesses, this twenty-third day of August, 1884.

SAMUEL STEWART.

Witnesses.
  JAMES G. MCLEAN,
  WILLIAM S. HALL.